(12) United States Patent
Sun et al.

(10) Patent No.: US 9,275,449 B2
(45) Date of Patent: Mar. 1, 2016

(54) METHODS AND SYSTEMS FOR DETERMINING A DOSE-TO-CLEAR OF A PHOTORESIST

(71) Applicant: GLOBALFOUNDRIES, Inc., Grand Cayman (KY)

(72) Inventors: Lei Sun, Albany, NY (US); Obert Reeves Wood, II, Loudonville, NY (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 194 days.

(21) Appl. No.: 13/943,253

(22) Filed: Jul. 16, 2013

(65) Prior Publication Data
US 2015/0023583 A1    Jan. 22, 2015

(51) Int. Cl.
*G06F 17/50*   (2006.01)
*G06T 7/00*    (2006.01)

(52) U.S. Cl.
CPC ..... *G06T 7/0004* (2013.01); *G06T 2207/10061* (2013.01); *G06T 2207/20056* (2013.01); *G06T 2207/30148* (2013.01)

(58) Field of Classification Search
USPC .......................................................... 716/50
See application file for complete search history.

(56) References Cited

U.S. PATENT DOCUMENTS

| 2002/0064719 A1* | 5/2002 | Toprac et al. .............. 430/30 |
| 2008/0230722 A1* | 9/2008 | Elian ........................ 250/492.2 |
| 2013/0185681 A1* | 7/2013 | Liu et al. .................... 716/51 |

OTHER PUBLICATIONS

Lorusso et al., "Flare in extreme ultraviolet lithography: metrology, out-of-band radiation, fractal point-spread function, and flare map calibration," J. Micro/Nanolith. MEMS MOEMS 8(4), 041505 (Oct.-Dec. 2009).

* cited by examiner

*Primary Examiner* — Mohammed Alam
(74) *Attorney, Agent, or Firm* — Ingrassia Fisher & Lorenz, P.C.

(57) ABSTRACT

A method of determining a dose-to-clear of a photoresist on a wafer includes providing an image of the wafer after the photoresist was exposed to a dose of energy and was developed, transforming the image of the wafer into frequency spectrum data, calculating an average frequency spectrum component of the frequency spectrum data, calculating a difference between the average frequency spectrum component and a noise average frequency spectrum component of a noise average frequency spectrum, and determining a dose-to-clear of the photoresist based on the difference between the average frequency spectrum component and the noise average frequency spectrum component.

20 Claims, 4 Drawing Sheets

METHODS AND SYSTEMS FOR DETERMINING A DOSE-TO-CLEAR OF A PHOTORESIST

TECHNICAL FIELD

Embodiments of the present disclosure are generally directed to methods and systems for determining a dose-to-clear of a photoresist. More particularly, embodiments of the present disclosure are directed to methods and systems for determining the dose-to-clear of the photoresist based on a frequency spectrum of an image of a wafer.

BACKGROUND

Generally, integrated circuits and other semiconductor devices are used in a variety of electronic applications, such as computers, cellular phones, personal computing devices, and many other applications. Home, industrial, and automotive devices, which in the past included only mechanical components, now have electronic parts that require semiconductor devices.

Semiconductor devices are manufactured by depositing many different types of material layers over a semiconductor workpiece or wafer, and patterning the various material layers using lithography. The material layers typically include thin films of conductive, semiconductive, and insulating materials that are patterned and etched to form integrated circuits (IC's). There may be a plurality of transistors, memory devices, switches, conductive lines, diodes, capacitors, logic circuits, and other electronic components formed on a single die or chip.

Lithography involves the transfer of an image of a mask to a material layer of a die or chip, also referred to as a wafer. The image is formed in a layer of photoresist, the photoresist is developed, and the developed photoresist is used as a mask during a process to alter the material layer, such as etching and patterning the material layer.

As feature sizes of semiconductor devices continue to decrease, as is the trend in the semiconductor industry, transferring patterns from a lithography mask to a material layer of a semiconductor device becomes more difficult, due to the scattering and the diffraction of the light used to expose the photoresist. The scattering of light at small feature sizes is known as projection optics flare. Projection optics flare is stray light produced by light scattering from lens inhomogeneities, contamination, and surface roughness in the optics of the lithography system. The amount of flare is inversely proportional to the square of the wavelength of the light, and has become a significant factor for Extreme Ultraviolet (EUV) lithography.

It is often desirable to measure the projection optics flare in a system. One method of measuring projection optics flare is known as the Kirk method. In the Kirk method, a "dose-to-clear" must be measured. Dose-to-clear is the amount of energy (dose) to which a photoresist must be exposed in order to dissolve the entire exposed area of the photoresist when the photoresist is developed.

The value for the dose-to-clear in a photoresist is traditionally determined by visually inspecting a series of Scanning Electron Microscope (SEM) resist images exposed at different doses. Visual inspection of the resist images is subjective, and the determined dose-to-clear may vary based on the person inspecting the images.

Other methods measure the contrast of the image and determine the dose-to-clear based on when the contrast in the images is equal to zero. Image contrast, however, is affected by differences in the photo-resist, under-layer coating material, post exposure baking conditions, and SEM settings (e.g., magnification, voltage, current, frame, etc.). Therefore, contrast methods may not yield satisfactory results under all experimental conditions.

As such, it is desirable to provide objective and widely applicable methods and systems for determining dose-to-clear in a lithographic process. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods and computer systems for determining a dose-to-clear of a photoresist are disclosed herein. In an exemplary embodiment, a method of determining a dose-to-clear of a photoresist on a wafer includes providing an image of the wafer after the photoresist was exposed to a dose of energy and was developed, transforming the image of the wafer into frequency spectrum data, calculating an average frequency spectrum component of the frequency spectrum data, calculating a difference between the average frequency spectrum component and a noise average frequency spectrum component of a noise average frequency spectrum, and determining a dose-to-clear the photoresist based on the difference between the average frequency spectrum component and the noise average frequency spectrum component.

In accordance with another exemplary embodiment, a method of determining projection optics flare in a lithographic system includes determining a dose-to-clear of a photoresist on a wafer and determining the projection optics flare based on the dose-to-clear. Determining the dose-to-clear includes providing an image of the wafer after the photoresist was exposed to a dose of energy and was developed, transforming the image of the wafer into frequency spectrum data, calculating an average frequency spectrum component of the frequency spectrum data, calculating a difference between the average frequency spectrum component and a noise average frequency spectrum component of a noise average frequency spectrum, and determining a dose-to-clear of the photoresist based on the difference between the average frequency spectrum component and the noise average frequency spectrum component.

In accordance with another exemplary embodiment, a non-transitory computer readable medium stores control logic for operating a computer system. The control logic includes control logic instructions for determining a dose-to-clear of a photoresist on a wafer by providing an image of the wafer after the photoresist was exposed to a dose of energy and was developed, transforming the image of the wafer into frequency spectrum data, calculating an average frequency spectrum component of the frequency spectrum data, calculating a difference between the average frequency spectrum component and a noise average frequency spectrum component of a noise average frequency spectrum, and determining a dose-to-clear the photoresist based on the difference between the average frequency spectrum component and the noise average frequency spectrum component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the present disclosure will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the present disclosure provide methods for determining a dose-to-clear a photoresist. The dose-to-clear may be used, for example, to determine the projection optics flare in a system using the Kirk method, as is known in the art. The methods use the Fourier or frequency spectra of Scanning Electron Microscope (SEM) images. Some of the images are taken when the photoresist has been completely dissolved, and at least one image is taken when some photoresist remains on the underlying layers.

Figure 1:
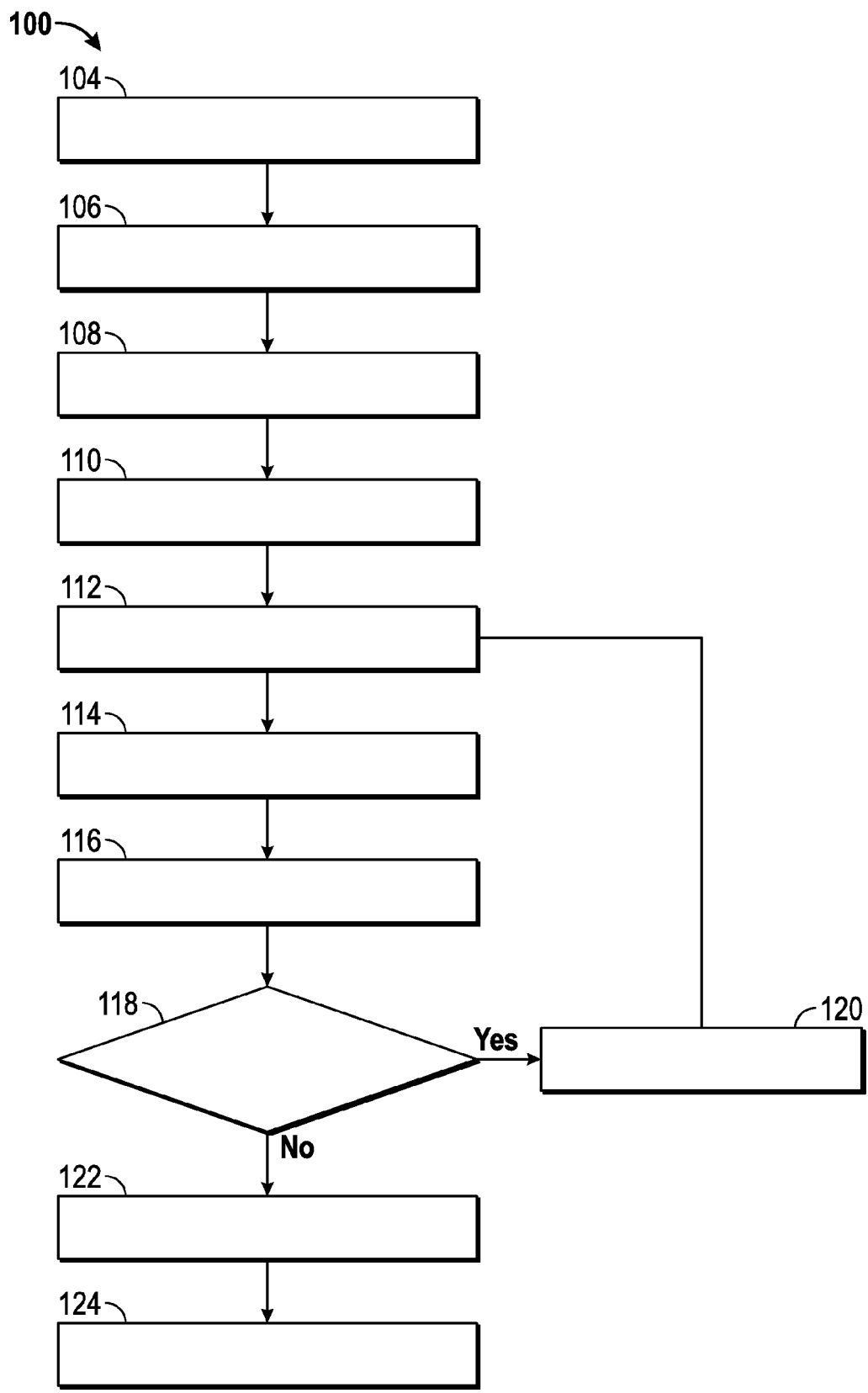
FIG. 1 is a flow diagram of a method for determining a dose-to-clear in accordance with various embodiments.

Referring now to FIG. 1, a method 100 of determining a dose-to-clear of a photoresist is illustrated in flow diagram form. As noted above, the dose-to-clear is the amount of energy (dose) to which a photoresist must be exposed in order to dissolve the entire exposed area of the photoresist when the photoresist is developed. In some embodiments, the method 100 may be part of a method to determine projection optics flare in a lithographic system. In other embodiments, the method 100 may be part of photoresist model calibration or outgassing methods. In the example provided, at least some of the operations of the method 100 are performed by a computer system that is configured to determine the dose-to clear.

In general, the method 100 compares the frequency spectrum of an average noise image to the frequency spectrum of developed photoresist images at various doses. A noise image is an image in which the photoresist has been completely cleared. A non-noise image corresponds to an image of the wafer in which some photoresist remains after development of the photoresist.

A dose of energy is selected in operation 104, and the photoresist is exposed to the dose in operation 106 and developed in operation 108. The dose is an amount of energy that will be evaluated to determine whether the selected dose clears or dissolves all of the photoresist from the wafer. The exposure and development may be performed by any suitable lithographic systems, as is known in the art.

An SEM image of the wafer is provided in operation 110. The SEM image is provided in the spatial domain in which the location of each pixel of the SEM image is indicated by a coordinate on each of two axes. The SEM image is taken after the photoresist has been exposed and developed in operations 106 and 108. Accordingly, the SEM image indicates whether the selected dose has completely dissolved the photoresist. In some embodiments, the dose selection, exposure, development, and SEM imaging may be performed by systems and users other than a system that performs the remaining operations of the method 100. For example, the remaining operations may be performed by a processor executing a set of instructions contained on a non-transitory computer readable medium or on a computer system by providing the SEM images at multiple doses in electronic format.

The SEM image is transformed into frequency spectrum data in operation 112. The SEM image is transformed to the frequency domain by use of a Fourier transform, as will be appreciated by those of skill in the art. In general, the frequency spectrum data represents the frequency of grey level values of the pixels across the image. A discrete Fourier transform may be used based on the discrete pixels of the SEM image. In some embodiments, Fast Fourier Transform (FFT) techniques are used to transform the SEM image to the frequency spectrum.

Figure 2:
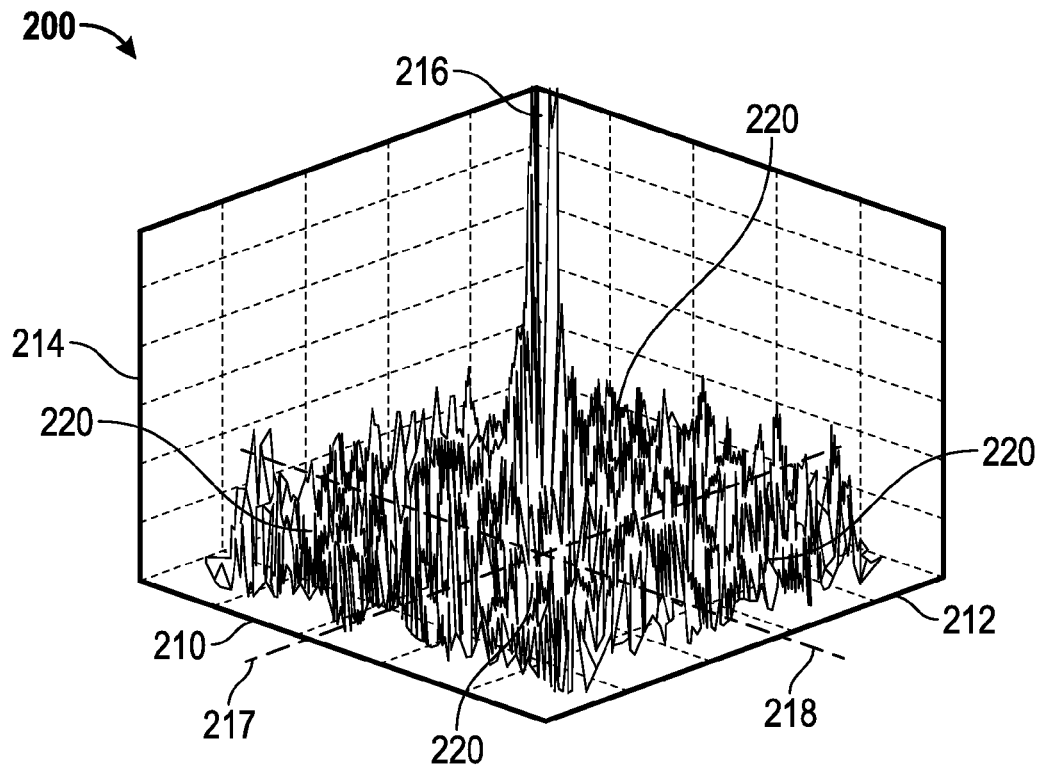
FIGS. 2 and 3 are graphical views of frequency spectra of images of a wafer in accordance with various embodiments.

With further reference to FIG. 2, a frequency spectrum 200 of an SEM image at the selected dose is illustrated in graphical form. The frequency spectrum 200 components corresponding to the vertical direction of the spatial domain SEM image are graphed along a first axis 210. The frequency spectrum 200 components corresponding to the horizontal direction of the spatial domain SEM image are graphed along a second axis 212. The frequency spectrum components at each frequency are represented by the height of the data point along a third axis 214, as will be appreciated by those skilled in the art. In the example provided, the frequency spectrum 200 corresponds to a non-noise SEM image in which some photoresist remains on the wafer.

The values along the third axis 214 are at a maximum in a center 216 of the graph, through which a first center line 217 and a second center line 218 extend on the plane defined by the first and second axes 210 and 212. The first center line 217 and the second center line 218 define four quadrants 220 that surround the center 216. The four quadrants 220 include values with non-zero Frequency components, indicating that the SEM image is a non-noise image that shows some remaining photoresist on the wafer. The Frequency components are non-zero in the quadrants 220 of a non-noise image because the exposed photoresist reshapes randomly or fragments into many small random shapes during dissolution of the photoresist. The spatial frequency spectra of these random shapes are different from those of background noise images, which are SEM images of the photoresist when the photoresist has been completely dissolved.

Referring again to FIG. 1 and with continued reference to FIG. 2, an average frequency spectrum component of the frequency spectrum data is calculated in operation 114. In the example provided, the average is taken only in the four quadrants 220. In the example provided, the frequency spectrum components along the center lines 217 and 218 may be excluded from the average. In some embodiments, data within an offset from the center lines 217 and 218 may be excluded from the average.

Figure 3:
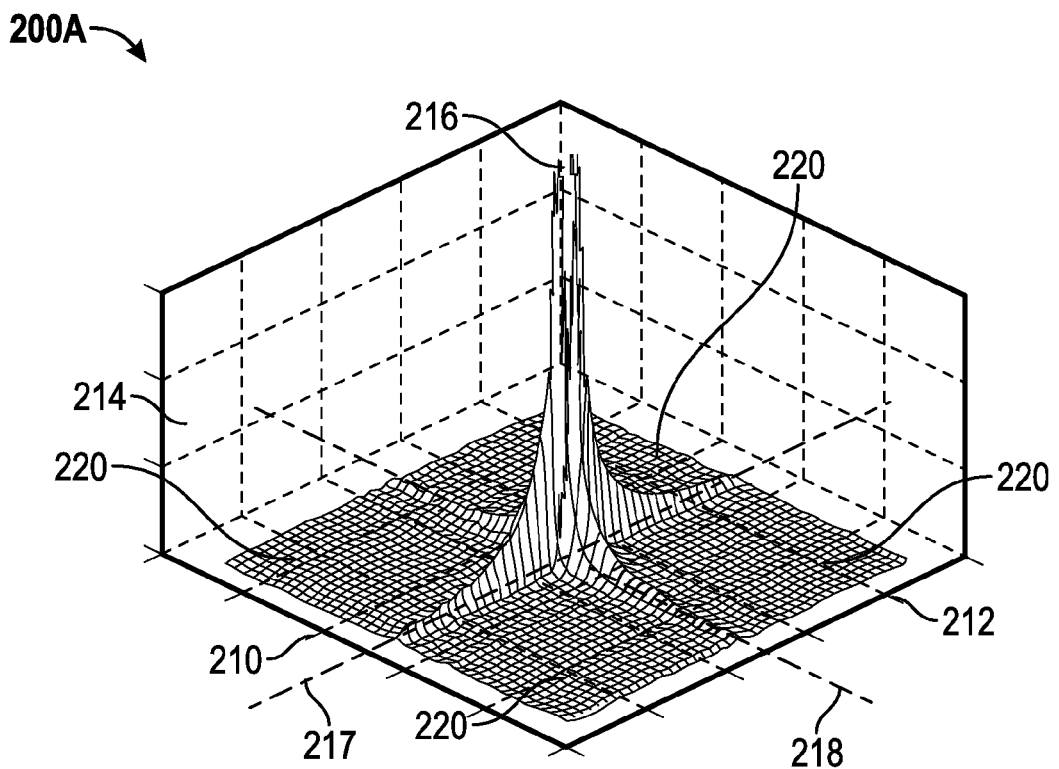

Referring again to FIG. 1, and with further reference to FIG. 3, a difference between the average frequency spectrum component of the SEM image and a noise average frequency spectrum component of a noise average frequency spectrum 200A is calculated in operation 116. The noise average frequency spectrum 200A is illustrated in graphical form in FIG. 3. The noise average frequency spectrum 200A is similar to the frequency spectrum 200, where like numbers represent like components. The noise average frequency spectrum 200A, however, is an average of the frequency spectra of SEM noise images that are taken when the photoresist has been completely dissolved from the wafer.

In the example provided, the noise average frequency spectrum 200A represents the averaged frequency spectra of 100 SEM noise images. A noise image in the spatial domain includes many pixels, which are rectangular shapes with different gray scale levels. The component values on the first axis 210 of the noise average frequency spectrum 200A are only significant on the first centerline 217 and the second centerline 218 due to the sharp rectangular pixel shapes. The amplitude of the components of the frequency spectrum on the third axis 214 of the noise average frequency spectrum 200A is only slightly above zero in the four quadrants 220.

The noise average frequency spectrum 200A may vary based on the particular SEM tool used during imaging. In some embodiments, each SEM tool is calibrated by determining an SEM tool specific average noise frequency spectrum 200A.

Because the fragmented photoresist in a non-noise image results in non-zero frequency spectra in the quadrants 220, the frequency spectra in the quadrants 220 may be used to determine whether the SEM image is a noise or a non-noise image. By focusing on these random shapes instead of image contrast, the method 100 is not affected by differences of resist, under-layer coating material, post exposure baking condition, and SEM settings.

Referring again to FIG. 1, operation 118 determines whether there are more doses to evaluate. When there are more doses to evaluate, a new dose is selected in operation 120 and method 100 returns to operation 106. In some embodiments, the doses are incrementally increased from a dose that is known to be less than the dose-to-clear to a dose that is known to be more than the dose-to-clear. Such a range of doses may assist with determination of the dose-to-clear, as discussed below with reference to FIG. 4.

Figure 4:
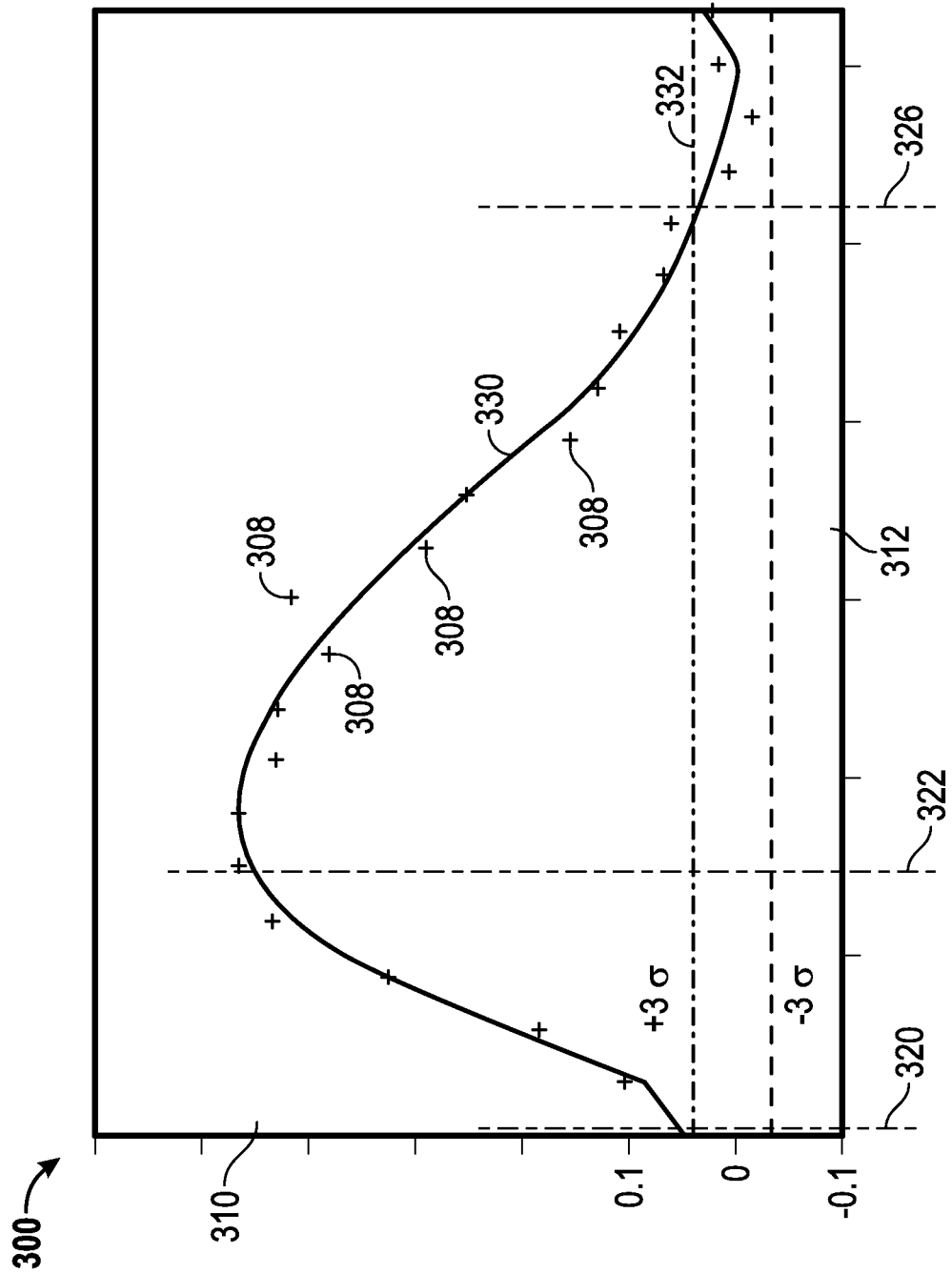
FIG. 4 is a graphical view of average frequency spectra values as a function of exposure dose in accordance with various embodiments.

When there are no more doses to evaluate, the dose to clear is determined in operation 122 based on the difference between the average components of the frequency spectra 200 and 200A. With further reference to FIG. 4, a graph 300 illustrates frequency difference values 308 between the frequency spectra 200 and 200A components on a first axis 310 as a function of dose on a second axis 312. Each of the frequency difference values 308 represents the difference calculated in operation 116 at the respective selected dose.

At a first dose 320 (e.g., at 18 mJ/cm$^2$), the photoresist has not started breaking down and is still uniform. The corresponding frequency difference value 308 is therefore still close to zero. As dose increases to the right on the second axis 312, the photoresist begins to fracture into small pieces. The number of small pieces reaches a maximum near a second dose 322 (e.g., at about 20 mJ/cm$^2$). The frequency difference value 308 at the second dose 322 is therefore the maximum value of the graph 300. At doses greater than the second dose 322, the frequency difference begins to decrease as the number of small photoresist pieces decreases.

A curve fitting 330 is calculated in operation 122 using the frequency difference values 308 using any suitable curve fitting technique. The dose-to-clear is determined in operation 124 to be the dose at which the value of the curve fitting 330 on the first axis 310 drops below a threshold difference 332. For example, the curve fitting 330 drops below the threshold difference 332 at a third dose 326 (e.g., 23.15 mJ/cm$^2$). In the example provided, the threshold difference 332 is equal to three times the standard deviation of the averaged spectrum components of the noise average frequency spectrum 200A. It should be appreciated that the value of the threshold difference 332 may be different, and may be selected based on the experimental conditions or the particular SEM tool used during the analysis.

Figure 5:
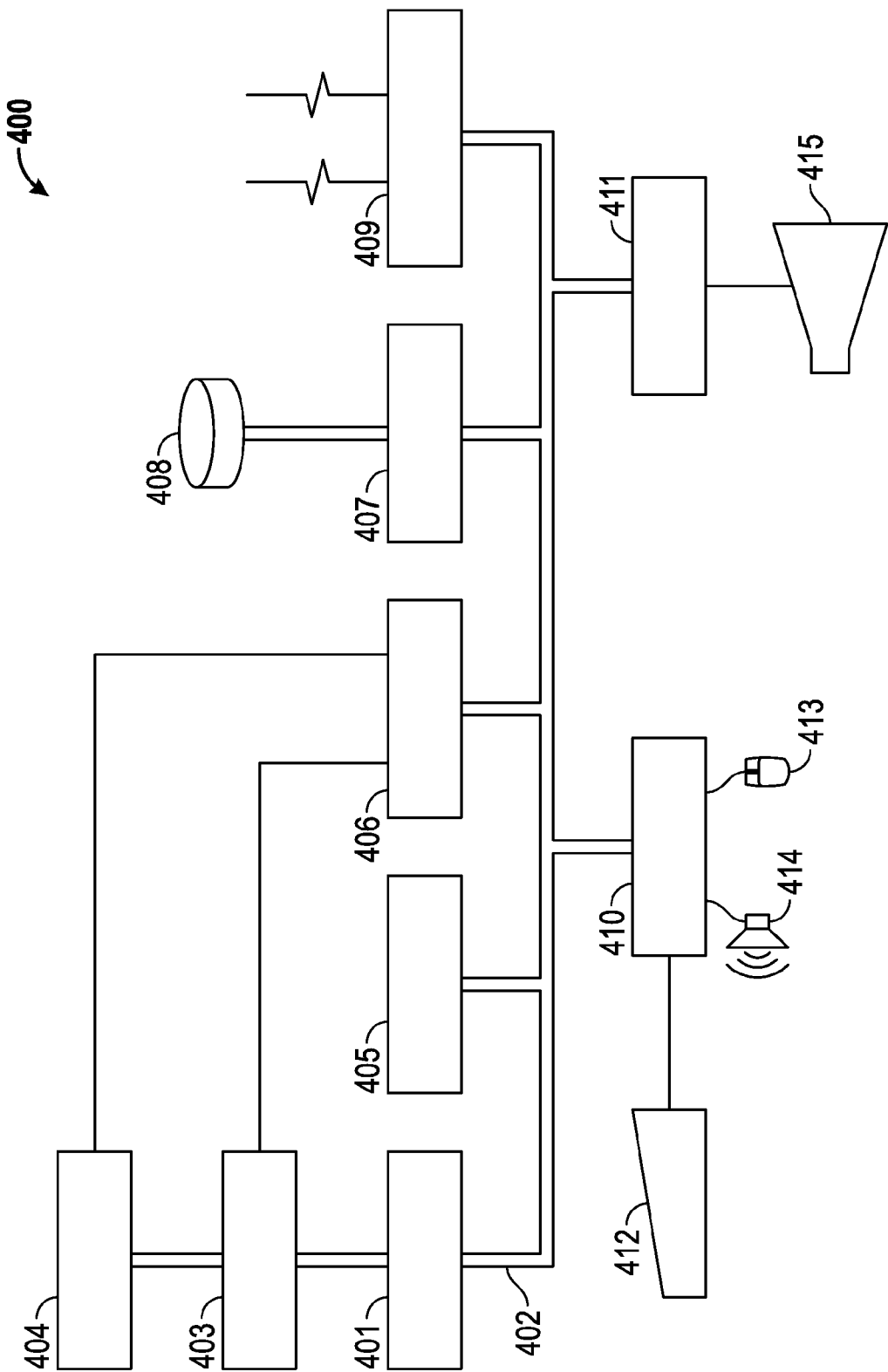
FIG. 5 is a block diagram of a computer system in accordance with various embodiments.

Advantageously, embodiments of the present disclosure can be implemented on one or more computer systems. For example, the operations of the method 100 may be performed using one or more computer systems. FIG. 5 is a schematic illustration of a block diagram of a computing system 400 arranged in accordance with some examples. Computer system 400 is also representative of a hardware environment for the present disclosure. For example, computer system 400 may have a processor 401 coupled to various other components by a system bus 402.

With further reference to FIG. 4, an operating system 403 may run on processor 401, and provide control and coordinate the functions of the various components. An application 404 in accordance with the principles of examples of the present disclosure may execute in conjunction with operating system 403, and provide calls and/or instructions to operating system 403 where the calls/instructions implement the various functions or services to be performed by application 404.

A read-only memory ("ROM") 405 may be coupled to system bus 402, and may include a basic input/output system ("BIOS") that can control certain basic functions of computer device 400. A random access memory ("RAM") 406 and a disk adapter 407 may also be coupled to system bus 402. Such memory components may be used to store, for example, the Optical Proximity Correction (OPC) model parameters or application 404 software code. It should be noted that software components, including operating system 403 and application 404, may be loaded into RAM 406, which may be computer system's main memory for execution. A disk adapter 407 may be provided which can be an integrated drive electronics ("IDE") or parallel advanced technology attachment ("PATA") adapter, a serial advanced technology attachment ("SATA") adapter, a small computer system interface ("SCSI") adapter, a universal serial bus ("USB") adapter, an IEEE 1394 adaptor, or any other appropriate adapter that communicates with a disk unit 408, e.g., disk drive.

Computer system 400 may further include a communications adapter 409 coupled to bus 402. Communications adapter 409 may interconnect bus 402 with an external network (not shown) thereby facilitating computer system 400 to communicate with other similar and/or different devices.

Input/Output ("I/O") devices may also be connected to computer system 400 via a user interface adapter 410 and a display adapter 411. For example, a keyboard 412, a mouse 413 and a speaker 414 may be interconnected to bus 402 through user interface adapter 410. Data may be provided to computer system 400 through any of these example devices. A display monitor 415 may be connected to system bus 402 by display adapter 411. In this example manner, a user can provide data or other information to computer system 400 through keyboard 412 and/or mouse 413, and obtain output from computer system 400 via display 415 and/or speaker 414.

The operations illustrated in FIG. 1 may be governed by instructions that are stored in a non-transitory computer readable storage medium and that are executed by at least one processor of the computer system 400. Each of the operations shown in FIG. 1 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The methods and systems disclosed herein exhibit several beneficial attributes. For example, a method is disclosed that eliminates user specific differences that result in measurement uncertainty. The method is independent of operator experience and experiment conditions. Furthermore, the value for dose-to-clear from the method is in close agreement with the value determined from visual inspection in the embodiments presented herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A computer-implemented method of determining a dose-to-clear of a photoresist on a wafer, wherein the dose-to-clear is the amount of energy to which the photoresist must be exposed in order to dissolve the entire exposed area of the photoresist when the photoresist is developed, the method comprising:
   providing an image of the wafer after the photoresist was exposed to a dose of energy and was developed;
   transforming, with a processor, the image of the wafer into frequency spectrum data;
   calculating, with the processor, an average frequency spectrum component of the frequency spectrum data;
   calculating, with the processor, a difference between the average frequency spectrum component and a noise average frequency spectrum component of a noise average frequency spectrum; and
   determining a dose-to-clear the photoresist based on the difference between the average frequency spectrum component and the noise average frequency spectrum component.

2. The method of claim 1, wherein the image of the wafer is provided in the spatial domain.

3. The method of claim 1, wherein calculating an average frequency spectrum component includes averaging the frequency spectrum data excluding frequency spectrum components along center lines of the frequency spectrum data.

4. The method of claim 1, wherein calculating a difference further includes calculating a difference using a noise average frequency spectrum component that is calibrated to the scanning electron microscope (SEM) tool used to take SEM noise images that are the spatial domain of the noise average frequency spectrum.

5. The method of claim 1, wherein determining the dose-to-clear includes calculating a best fit curve of the calculated differences.

6. The method of claim 5, wherein determining the dose-to-clear includes determining the dose-to-clear as the dose at which the calculated difference at the best fit curve is less than a threshold.

7. The method of claim 6, wherein the threshold is from one to ten times the standard deviation of the noise average frequency spectrum component.

8. The method of claim 1, wherein transforming the image of the wafer into frequency spectrum data includes transforming the image of the wafer using a Fourier transform.

9. The method of claim 8, wherein using a Fourier transform includes using a discrete Fourier transform based on the pixels of the image of the wafer.

10. A computer-implemented method of determining projection optics flare in a lithographic system, the method comprising:
    determining a dose-to-clear of a photoresist on a wafer, wherein the dose-to-clear is the amount of energy to which the photoresist must be exposed in order to dissolve the entire exposed area of the photoresist when the photoresist is developed, determining the dose-to-clear comprising:
      providing an image of the wafer after the photoresist was exposed to a dose of energy and was developed;
      transforming, with a processor, the image of the wafer into frequency spectrum data;
      calculating, with the processor, an average frequency spectrum component of the frequency spectrum data;
      calculating, with the processor, a difference between the average frequency spectrum component and a noise average frequency spectrum component of a noise average frequency spectrum; and
      determining a dose-to-clear the photoresist based on the difference between the average frequency spectrum component and the noise average frequency spectrum component; and
    determining the projection optics flare based on the dose-to-clear.

11. The method of claim 10, wherein calculating an average frequency spectrum component includes averaging the frequency spectrum data excluding frequency spectrum components along center lines of the frequency spectrum data.

12. The method of claim 10, wherein determining the dose-to-clear includes calculating a best fit curve of the calculated differences and determining the dose-to-clear as the dose at which the calculated difference at the best fit curve is less than a threshold.

13. A non-transitory computer readable medium storing control logic for operating a computer system, the control logic including control logic instructions for determining a dose-to-clear of a photoresist on a wafer, wherein the dose-to-clear is the amount of energy to which the photoresist must be exposed in order to dissolve the entire exposed area of the photoresist when the photoresist is developed, the instructions when executed by a processor perform the steps comprising:
    providing an image of the wafer after the photoresist was exposed to a dose of energy and was developed;
    transforming the image of the wafer into frequency spectrum data;
    calculating an average frequency spectrum component of the frequency spectrum data;
    calculating a difference between the average frequency spectrum component and a noise average frequency spectrum component of a noise average frequency spectrum; and
    determining a dose-to-clear the photoresist based on the difference between the average frequency spectrum component and the noise average frequency spectrum component.

14. The non-transitory computer readable medium of claim 13, wherein the control logic is further configured for providing the image of the wafer in the spatial domain.

15. The non-transitory computer readable medium of claim 13, wherein the control logic is further configured for averaging the frequency spectrum data excluding frequency spectrum components along center lines of the frequency spectrum data.

16. The non-transitory computer readable medium of claim 13, wherein the control logic is further configured for calculating a difference using a noise average frequency spectrum component that is calibrated to the scanning electron microscope (SEM) tool used to take SEM noise images that are the spatial domain of the noise average frequency spectrum.

17. The non-transitory computer readable medium of claim 13, wherein the control logic is further configured for calculating a best fit curve of the calculated differences and determining the dose-to-clear as the dose at which the calculated difference at the best fit curve is less than a threshold.

18. The non-transitory computer readable medium of claim 13, wherein the threshold is from one to ten times the standard deviation of the noise average frequency spectrum component.

19. The non-transitory computer readable medium of claim 18, wherein the control logic is further configured for transforming the image of the wafer using a Fourier transform.

20. The non-transitory computer readable medium of claim 19, wherein the control logic is further configured for using a discrete Fourier transform based on the pixels of the image of the wafer.

* * * * *